United States Patent
Shimada

(10) Patent No.: US 7,835,367 B2
(45) Date of Patent: Nov. 16, 2010

(54) NETWORK CONNECTION METHOD, NETWORK CONNECTION SYSTEM, AND, LAYER 2 SWITCH AND MANAGEMENT SERVER FORMING THE NETWORK CONNECTION SYSTEM

(75) Inventor: Katsumi Shimada, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 720 days.

(21) Appl. No.: 11/087,385

(22) Filed: Mar. 23, 2005

(65) Prior Publication Data

US 2005/0180391 A1 Aug. 18, 2005

Related U.S. Application Data

(63) Continuation of application No. PCT/JP2003/005199, filed on Apr. 23, 2003.

(51) Int. Cl.
 *H04L 12/28* (2006.01)
 *H04L 12/56* (2006.01)
 *H04J 3/16* (2006.01)
 *H04J 3/22* (2006.01)

(52) U.S. Cl. .......................... 370/397; 370/409; 370/469

(58) Field of Classification Search ................. 370/351, 370/395.53, 397, 409, 395.3, 395.31, 395.32, 370/396, 399, 400, 401
See application file for complete search history.

(56) References Cited

U.S. PATENT DOCUMENTS

| 6,223,218 B1* | 4/2001 | Iijima et al. ................ 709/221 |
|---|---|---|
| 6,847,620 B1* | 1/2005 | Meier ........................ 370/328 |
| 6,873,602 B1* | 3/2005 | Ambe ........................ 370/254 |
| 7,079,544 B2* | 7/2006 | Wakayama et al. ......... 370/401 |
| 7,095,738 B1* | 8/2006 | Desanti ...................... 370/389 |
| 2002/0003801 A1* | 1/2002 | Hwa et al. ................... 370/401 |
| 2003/0110268 A1* | 6/2003 | Kermarec et al. ........... 709/227 |
| 2003/0133412 A1* | 7/2003 | Iyer et al. .................... 370/235 |
| 2004/0017816 A1* | 1/2004 | Ishwar et al. ........... 370/395.53 |
| 2004/0081171 A1* | 4/2004 | Finn ...................... 370/395.53 |
| 2004/0120259 A1* | 6/2004 | Jones et al. ................ 370/250 |
| 2004/0165600 A1* | 8/2004 | Lee ........................ 370/395.53 |
| 2007/0297420 A1* | 12/2007 | Holmgren et al. ........... 370/397 |

FOREIGN PATENT DOCUMENTS

| JP | 10-093614 | 4/1998 |
|---|---|---|
| JP | 2001-339437 | 12/2001 |
| JP | 2002-026955 | 1/2002 |

\* cited by examiner

*Primary Examiner*—Seema S Rao
*Assistant Examiner*—Xavier Szewai Wong
(74) *Attorney, Agent, or Firm*—Katten Muchin Rosenman LLP

(57) ABSTRACT

In a network connection method for interconnecting a virtual LAN distributed over plural sites via a network formed by plural layer 2 switches, a layer 2 switch monitors a first virtual LAN configuring frame sent from a site in the plural sites for configuring the virtual LAN, a network virtual LAN identifier is assigned based on the monitored first virtual LAN configuring frame, and the layer 2 switch generates a second virtual LAN configuring frame based on the assigned network virtual LAN identifier, and transmits the second virtual LAN configuring frame to the plural layer 2 switches in the network so as to establish the virtual LAN distributed over the plural sites. Accordingly, configuration and operation of a virtual LAN in a network of the layer 2 switches can be performed efficiently according to the virtual LAN tag of the subscriber.

14 Claims, 13 Drawing Sheets

FIG.10

TABLE A

| SUBSCRIBER INITIAL SET VLAN | MAXIMUM ALLOWABLE NUMBER OF VIDS BY CONTRACT | NUMBER OF ASSIGNED VIDS | POINTER TO ASSIGNED VID MANAGEMENT TABLE |
|---|---|---|---|
| ... | ... | ... | ... |
| 100 | 5 | 1 | POINTER TO TABLE B |
| ... | ... | ... | ... |

TABLE B

| SUBSCRIBER VID | PROVIDER VID |
|---|---|
| 201 | 500 |
| UNASSIGNED | UNASSIGNED |
| UNASSIGNED | UNASSIGNED |
| UNASSIGNED | UNASSIGNED |
| UNASSIGNED | UNASSIGNED |

FIG.12

TABLE C

| | |
|---|---|
| TABLE RELATIVE POSITION 0 | FLAG INDICATING WHETHER PROVIDER VID IS SET FOR SUBSCRIBER VID=0 | PROVIDER VID VALUE |
| TABLE RELATIVE POSITION 1 | FLAG INDICATING WHETHER PROVIDER VID IS SET FOR SUBSCRIBER VID=1 | PROVIDER VID VALUE |
| TABLE RELATIVE POSITION 2 | FLAG INDICATING WHETHER PROVIDER VID IS SET FOR SUBSCRIBER VID=2 | PROVIDER VID VALUE |
| | ... | ... |
| TABLE RELATIVE POSITION 4095 | FLAG INDICATING WHETHER PROVIDER VID IS SET FOR SUBSCRIBER VID=4095 | |

NETWORK CONNECTION METHOD, NETWORK CONNECTION SYSTEM, AND, LAYER 2 SWITCH AND MANAGEMENT SERVER FORMING THE NETWORK CONNECTION SYSTEM

CROSS-REFERENCE TO RELATED APPLICATION

This application is a U.S. continuation application filed under 35 USC 111(a) claiming benefit under 35 USC 120 and 365(c) of PCT application PCT/JP2003/005199, filed Apr. 23, 2003. The foregoing application is hereby incorporated by reference.

BACKGROUND OF THE INVENTION

1. Field of the Invention

The present invention relates to a network connection method, a network connection system, and a layer 2 switch and a management server forming the network connection system. More particularly, the present invention relates to a network connection method, a network connection system, and a layer 2 switch and a management server forming the network connection system for interconnecting virtual LANs that are distributed over a plurality of sites.

2. Description of the Related Art

In recent years, as one kind of private network services provided by a service provider, a service is being provided for transferring a layer 2 MAC frame, as it is, of a subscriber LAN and the like from a site to another site to which the subscriber belongs by using layer 2 switches (to be referred to as L2 switch hereinafter). Compared with a service based on layer 3 switches, since the above-mentioned service can handle protocols other than the IP protocol, the above-mentioned service can be expected to become further widespread as a more general service.

FIG. 1 shows a block diagram of an example of a conventional network connection system for providing the above-mentioned service. In the figure, a network 10 of a service provider is configured by L2 switches as a mesh or tree topology. In addition, in the network 10, the MAC frame may be encapsulated and transmitted via an ATM network and the like other than a LAN. Sites 11, 12 and 13 of a subscriber A and sites 14 and 15 of a subscriber B are connected to the network 10. For example, the sites 11, 12 and 13 of the subscriber A are a Tokyo branch, a Oosaka branch and a Nagoya branch respectively.

In the network 10, since MAC frames of the plural subscribers A and B are transferred, it is necessary to identify a subscriber for each MAC frame so as to identify a port of a transfer destination. Therefore, a method for providing a VLAN (Virtual Local Area Network) tag specific for each subscriber is used to identify the subscriber.

By the way, a subscriber may establishes a plurality of VLANs in a site of the subscriber. For example, the subscriber may establishes VLANs for each organization in a company. FIG. 2 shows a block diagram of an example of such a conventional network connection system.

In this case, it is necessary that, a VLAN tag is provided to a MAC frame in each of the sites 11, 12 and 13 of the subscriber, and the MAC frame is transferred transparently over the network of the service provider. However, since the VLAN tag of the subscriber is decided arbitrarily by the subscriber, there is a possibility that the VLAN tag provided by the subscriber may be the same as a VLAN tag used by the service provider for transferring the MAC frame over the network 10.

To avoid this problem, a following method is used. That is, in each edge switch (a switch placed at a position that is connected to a subscriber side (L2 switches 16, 17 and 18)), as shown in a format in FIG. 3, the VLAN tag 20 provided in the subscriber side in the MAC frame sent from the subscriber is kept as it is, and a new VLAN tag 21 is provided for transferring the MAC frame in the network 10 of the service provider.

For example, a VLAN tag 21 provided at an edge L2 switch 16 of the service provider is removed at a L2 switch 17 placed at an edge of a site of the transfer destination, so that a MAC frame having only the VLAN tag of the subscriber is transferred to the subscriber. The above-mentioned function for adding or removing a new VLAN tag at an edge L2 switch of the service provider side is called VLAN tag stacking.

As a further conventional technology, for example, Japanese Laid-Open Patent Application No. 2002-26955 discloses an ID identification method in which each of a LAN switch and a terminal includes a function for identifying a GVRP (GARP VLAN) frame and a new protocol, and a GW (Gateway) address kept by each terminal is used for determining a VLAN-ID to be assigned to each terminal.

In addition, Japanese Laid-Open Patent Application NO. 10-93614 discloses that MAC address learning in a LAN switch is performed for each VLAN.

As to a source MAC address and a destination MAC address used in the network 10 of the L2 switches, there is a case where a predetermined specific MAC address is used for a kind of a protocol. For example, to use functions of VRRP (a protocol for virtual router) shown in RFC 2338, "00-00-5E-00-01-{VRID}" is used as a MAC address, wherein "VRID" is a variable and is one octet information used for identifying a router.

In addition, when VLANs are formed in a network of the subscriber, since the L2 switch has a function (IVL mode in IEEE802.1d) for performing address learning for each VLAN independently, the same MAC address such as "00-00-5E-00-01-01" of VRRP can be used and operated in each VLAN by separating the VLANs.

That is, even for networks that are physically interconnected, if each VLAN can be identified, any MAC address can be used in each VLAN. Other than the VRRP, for example, when a local MAC address is used, there may be a case where the same MAC address may be used in different VLANs.

However, if a configuration shown in FIG. 4 is adopted for connecting a plurality of VLANs of a subscriber via the network 10 of the service provider, a following problem arises.

Since the network 10 of the service provider is formed by the L2 switches 16 and 17 and the like, learning of MAC addresses is performed in the edge L2 switch for each VLAN tag of the provider added by the VLAN tag stacking function. That is, learning of MAC addresses is not performed for each VLAN tag of the subscriber.

Therefore, a MAC frame having a MAC address "00-00-5E-00-01-01" of a node of a subscriber may be sent from the Tokyo site 11 and may be sent from the Oosaka site 12, so that communications cannot be performed properly. For example, when a user tries to send a MAC frame to "00-00-5E-00-01-01" in a VLAN 201 (in the Oosaka site 12) from the Tokyo site 11, at this time, there is a possibility that the L2 switch 16 has learned that "00-00-5E-00-01-01" of a VLAN 301 exists at the Tokyo site 11. In this case, when the MAC frame is sent to the L2 switch 16 at the edge of the provider from the Tokyo site 11, the frame is filtered so that any communication cannot be performed.

To solve this problem, it can be considered that the L2 switch in the network of the provider performs learning of MAC addresses including VLAN tags of subscribers. Generally, in L2 switches, CAM (Content Addressable Memory) is used for increasing speed for address learning and for searching learning results. For learning a MAC address including a VLAN tag for a subscriber, an address space having 72 bits is necessary since bits to be learned are 48 bits of the MAC address and double arranged 12 bits of a VLAN tag. But, the cost of the apparatus increases when adopting a CAM having such a large address space. In addition, a special L2 switch is necessary and such a special L2 switch is more expensive than a general L2 switch.

In addition, as another solution, it can be considered to provide a VLAN-ID (to be referred to as "VID" hereinafter) as the VLAN tag of the provider according to a value of the VLAN tag of the subscriber. That is, the L2 switch at the edge of the provider refers to a VLAN tag of a frame sent from a subscriber, obtains a VID in the network of the provider based on the VLAN tag, and provides the VID to the frame by using the VLAN tag stacking function.

Accordingly, since address learning at the L2 switch of the provider is performed for each VID corresponding to each different VLAN in the subscriber side, the above-mentioned problem can be solved. However, for realizing this solution, each time when the subscriber adds or deletes a VLAN, it becomes necessary to change setting for providing a VLAN tag, so that there is a problem in that enormous efforts need to be expended for network management.

SUMMARY OF THE INVENTION

An overall object of the present invention to provide a network connection method, a network connection system, and a layer 2 switch and a management server that form the network connection system for configuring and operating a virtual LAN in a network of layer 2 switches according to a virtual LAN tag of the subscriber.

The object is achieved by a network connection method for interconnecting a virtual LAN distributed over a plural sites via a network formed by plural layer 2 switches, a layer 2 switch monitors a first virtual LAN configuring frame sent from a site in the plural sites for configuring the virtual LAN, a network virtual LAN identifier is assigned based on the monitored first virtual LAN configuring frame, and the layer 2 switch generates a second virtual LAN configuring frame based on the assigned network virtual LAN identifier, and transmits the second virtual LAN configuring frame to the plural layer 2 switches in the network so as to configure the virtual LAN distributed over the plural site.

According to the network connection method, configuration and operation of a virtual LAN in a network of the layer 2 switches can be performed efficiently according to the virtual LAN tag of the subscriber.

BRIEF DESCRIPTION OF THE DRAWINGS

Other objects, features and advantages of the present invention will become more apparent from the following detailed description when read in conjunction with the accompanying drawings, in which:

FIG. 10 shows a table A for subscribers and table B for managing assigned VID.

FIG. 12 shows a table C of a L2 switch.

DETAILED DESCRIPTION OF THE PREFERRED EMBODIMENTS

In the following, embodiments of the present invention are described with reference to figures.

Figure 1:
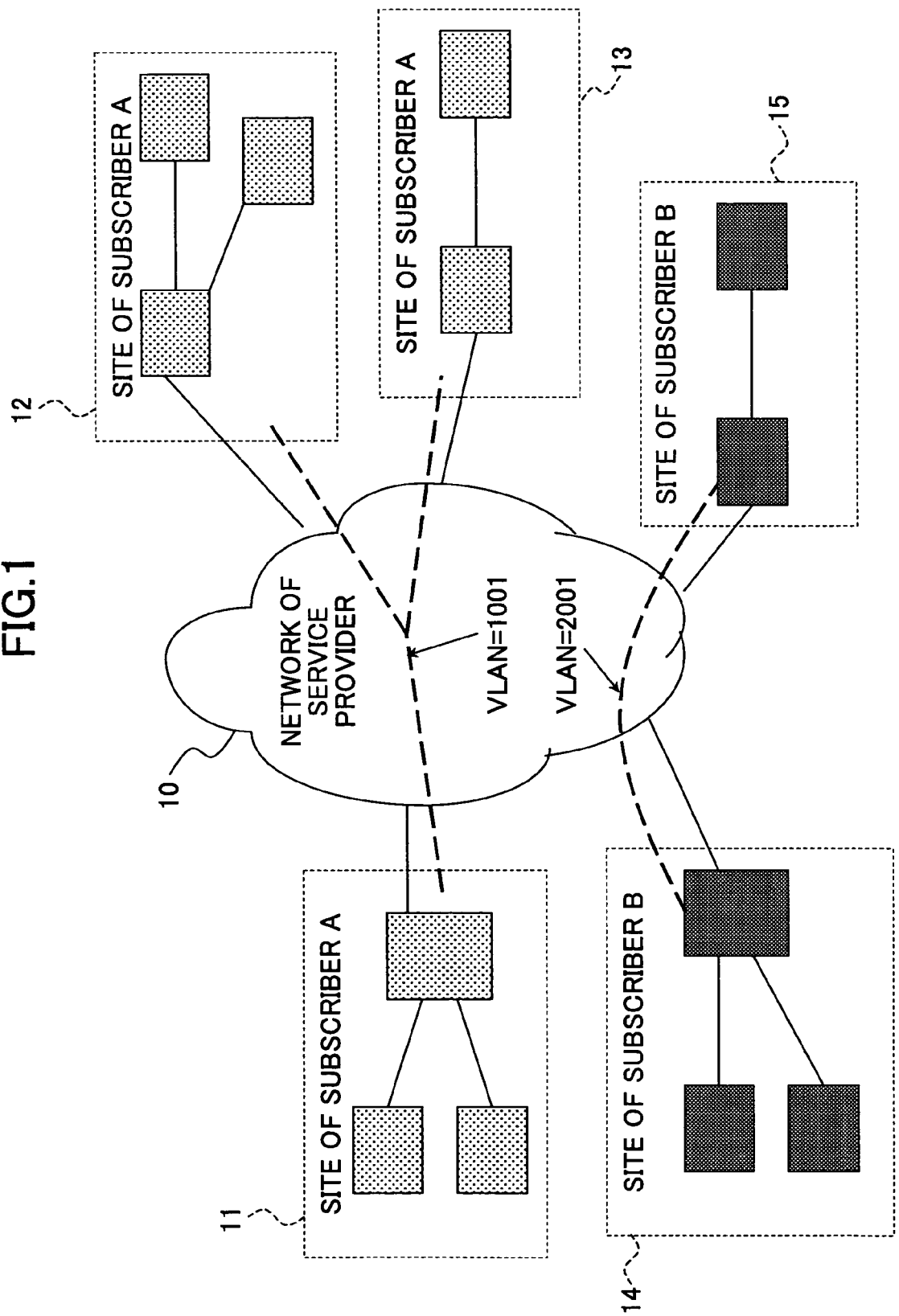
FIG. 1 is a block diagram of an example of a conventional network connection system.
Figure 2:
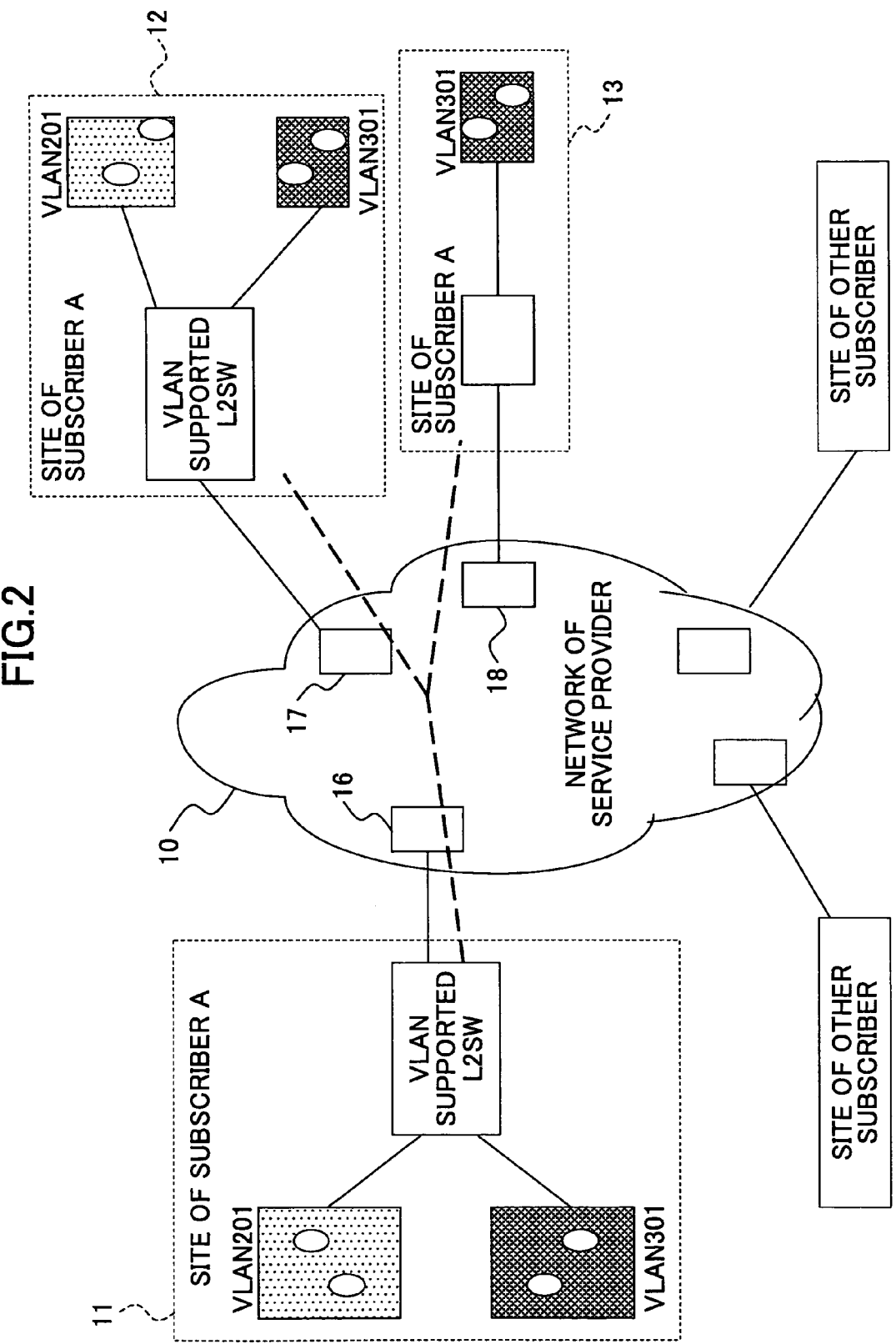
FIG. 2 is a block diagram of another example of a conventional network connection system.
Figure 4:
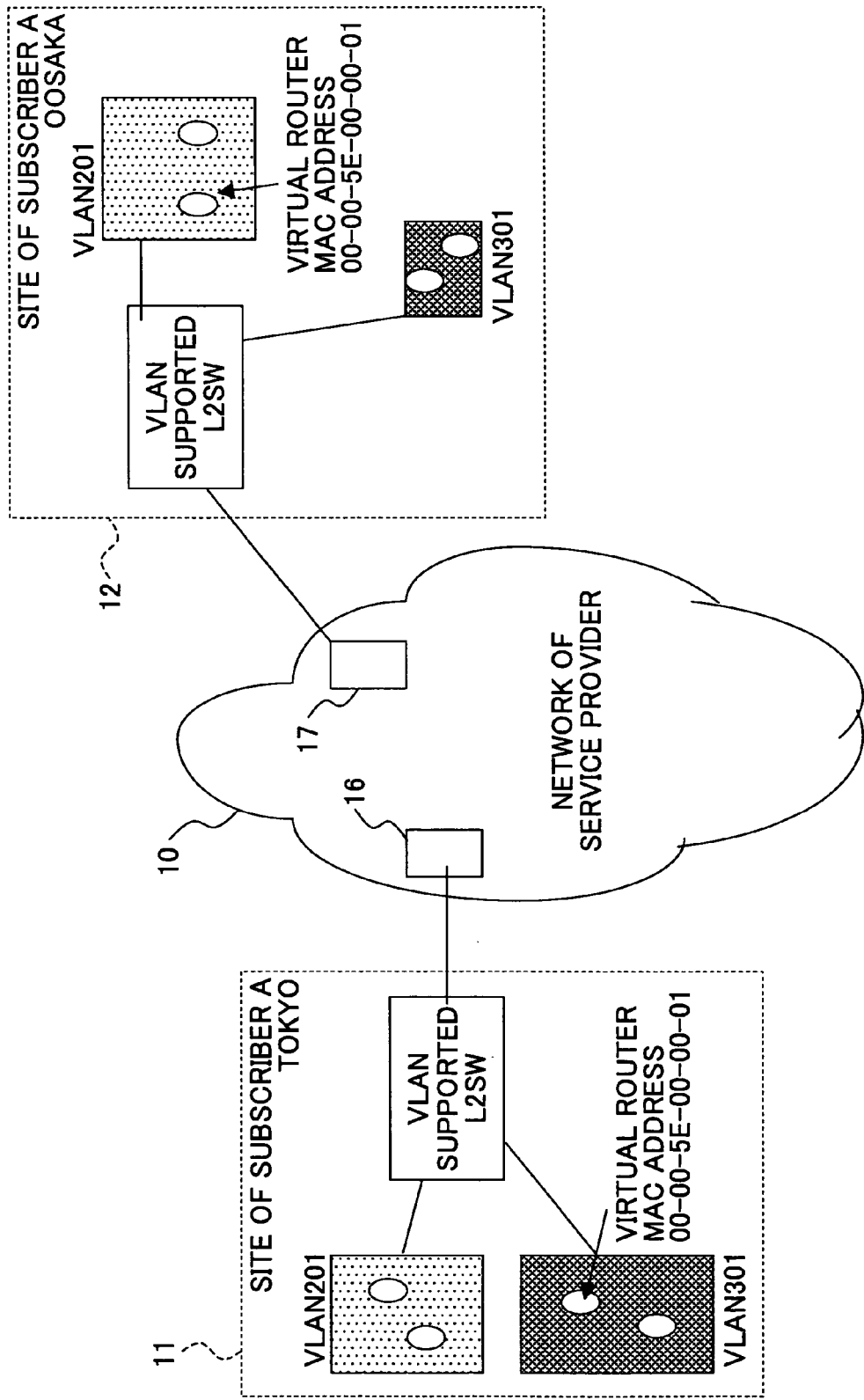
FIG. 4 is a network configuration diagram for explaining a conventional technology.
Figure 5:
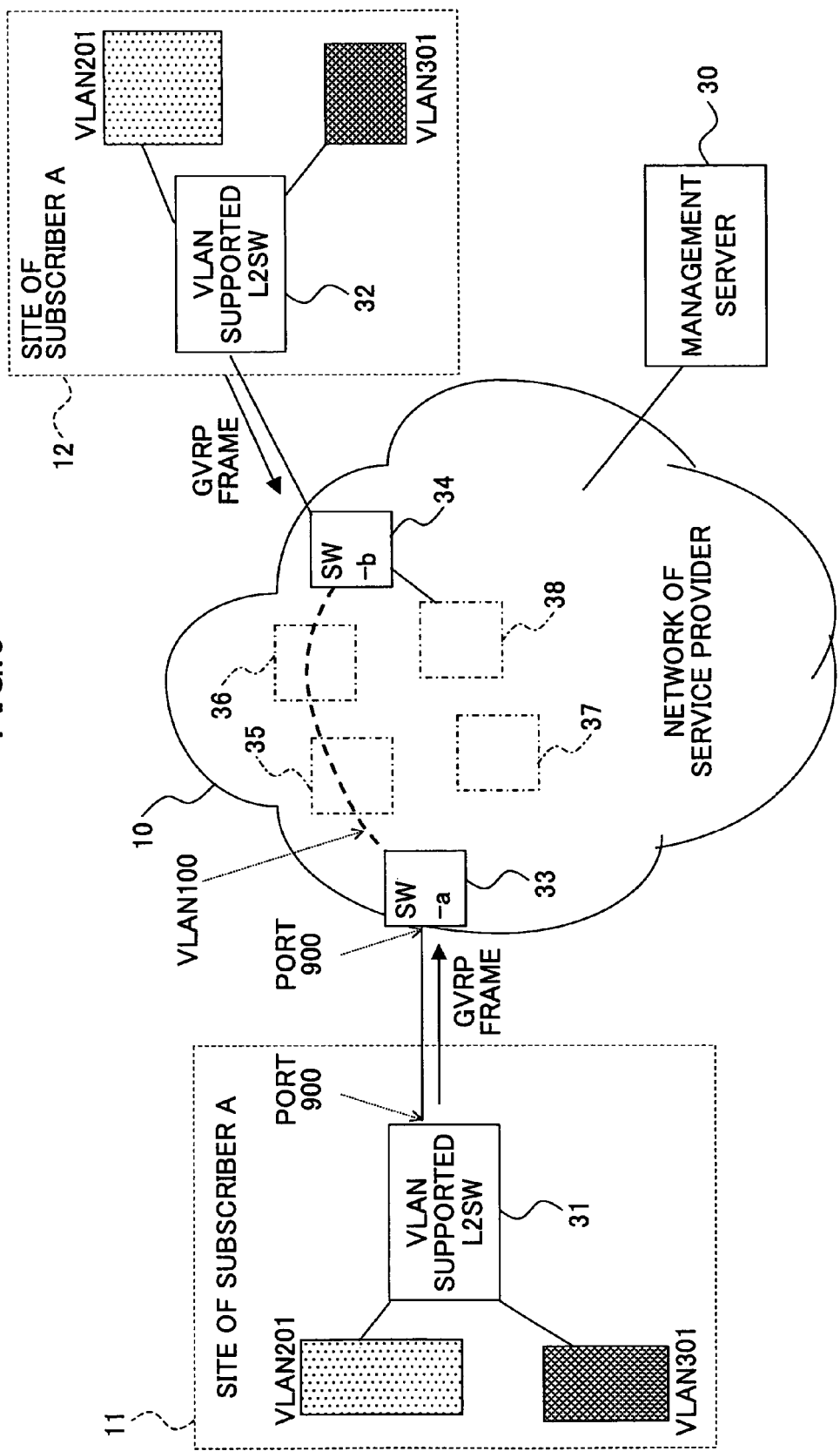
FIG. 5 is a block diagram of an embodiment of a network connection system of the present invention.

FIG. 5 shows a block diagram of an embodiment of the network connection system of the present invention. In the figure, the same reference numerals are used to identify corresponding features in FIGS. 2 and 4. In FIG. 5, a network 10 of a service provider is configured by L2 switches as a mesh or tree topology. In addition, in the network 10, a MAC frame may be encapsulated and transmitted via an ATM network and the like. Sites 11 and 12 of a subscriber A and a management server 30 are connected to the network 10.

For establishing a VLAN in the network formed by the L2 switch group, it is necessary to make settings for each port for each L2 switch to identify which VLAN belongs to which port in the L2 switch. According to the settings, the L2 switch selects a port for transferring a MAC frame.

If a network manager manually makes the settings of the VLAN for each L2 switch, man-hours of work are needed, and there is a fear that the network manager may cause an error. Thus, in IEEE802.1Q, a method is proposed for automatically configuring a VLAN by using GVRP(GARP VLAN Registration Protocol). GARP (Generic Attribute Registration Protocol) is defined in IEEE 802.1p.

According to the GVRP, a subscriber only makes settings manually for terminals and a L2 switch connected to the terminals to set a VLAN, so that the L2 switch sends configuration information of the VLAN to an adjacent L2 switch by using a message, and finally, information of the VLAN is transmitted to every L2 switch, so that the configuration of the VLAN is set in the whole of the network of the L2 switches.

In the network connection system of the present invention, the VLAN in the network of the provider is automatically configured by using the GVRP that is used for configuring a VLAN in the subscriber's side.

First, when a plurality of VLANs (VLAN201, VLAN301) of the subscriber A are configured over a plurality of sites 11 and 12, each of L2 switches (31, 32) in the sites (11, 12) of the subscriber A sends a GVRP frame for configuring the VLAN of the sites 11 and 12 to another site. This function is already realized in a L2 switch having VLAN functions. In addition, at this time, it is assumed that a VLAN (VLAN100) for connecting the sites 11 and 12 has been already established.

A switch (33, 34) monitors the GVRP frame and obtains a VID used in the subscriber side A, and sends the VID to the management server 30 that collectively manages VLANs in the network 10 of the provider.

The management server 30 checks if a new VID is used for the subscriber A. If the management server 30 detects that a new VID is used, the management server 30 assigns a VID, corresponding to the new VID, to be used in the network of the provider, and sends an instruction to configure a VLAN and the assigned VID to the edge L2 switch by using a message.

The L2 switch that receives the message generates a GVRP frame based on the VID sent from the management server 30, and sends the GVRP frame to adjacent L2 switches 35, 36, 37 and 38 in the network 10 of the provider. Accordingly, a VLAN can be automatically configured in the network 10 of the provider.

It is assumed that each of the edge switches 33 and 34 includes the before-mentioned VLAN tag stacking function. By using the function, the edge L2 switch refers to a VLAN tag sent from the subscriber, and stacks a VLAN tag having a tag of a VID used in the provider 10, and sends the frame to the network 10. Accordingly, transferring and address learning according to VLAN can be performed in the network 10.

In addition, also as to a GVRP frame sent from the subscriber, the edge L2 switch stacks a VALN tag in the same way and sends the frame to the network 10. Accordingly, the GVRP frame can be distinguished from a GVRP frame, used in the network 10, that does not include a VLAN tag, so that a GVRP frame from the subscriber can be transparently transferred.

Instead of transmitting the GVRP frame in the network 10 of the provider, the management server 30 may sends an instruction message for configuring a VLAN to L2 switches in the network 10 on line. Also by this method, the VLAN can be automatically configured in the network.

In the following, the network connection system of the present invention is described more specifically.

In FIG. 5, a VLAN (VLAN100) is set beforehand in the L2 switches 33-36 in the provider. This VLAN will be used for transferring the GVRP frame from a site (11, 12) of the subscriber A to another site of the subscriber. In addition, the VLAN is also used for transferring a MAC frame that does not belong to any particular VLAN.

The management server 30 is an apparatus for operating and maintaining the network 10 of the provider, and the management server 30 makes various settings for L2 switches that form the network 10. For example, the management server 30 collectively manages VIDs used in the network 10 and sets VIDs to each L2 switch.

When a new VLAN is defined in the site 11 of the subscriber A, a GVRP framed is sent from a port 900 of the L2 switch in the site 11 of the subscriber A.

Figure 6:
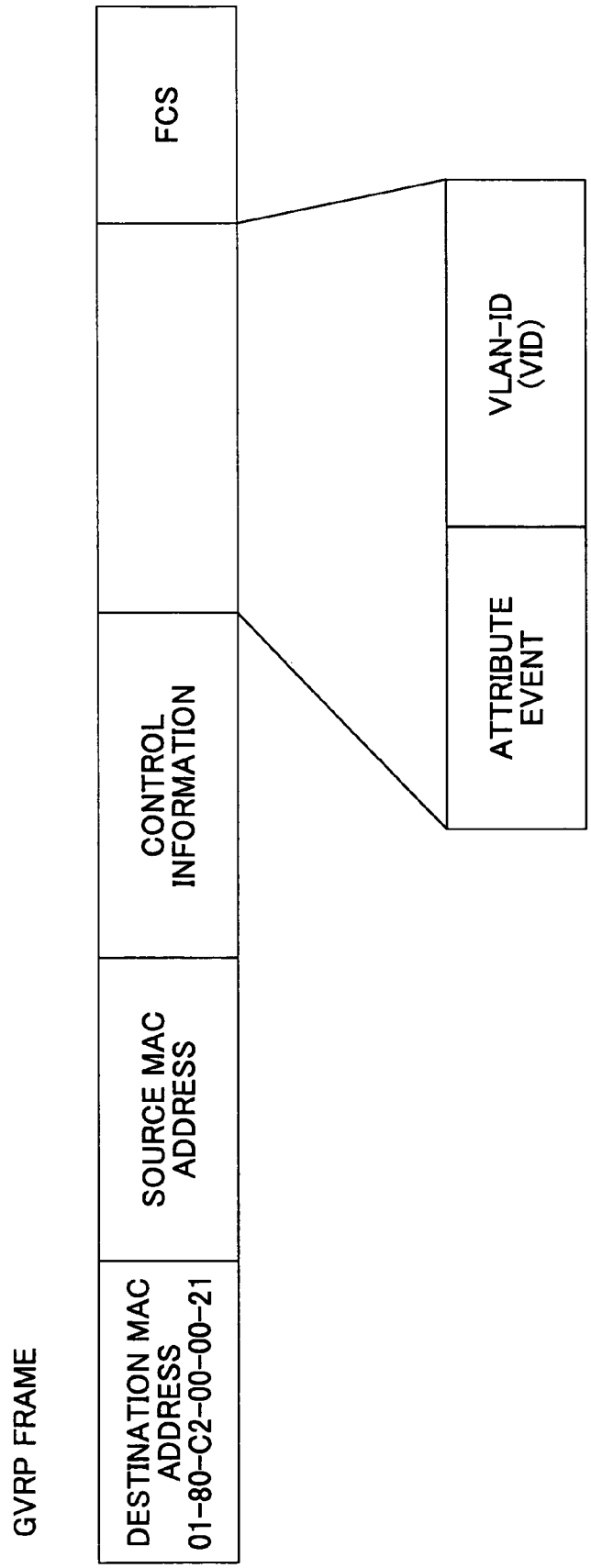
FIG. 6 shows a format of a GVRP frame.

FIG. 6 shows a format of the GVRP frame. In the figure, the GVRP frame includes a destination MAC address, a source MAC address, control information, an attribute event, a VLAN tag (VLAN-ID), and FCS. The attribute event indicates a command such as "Join" and "Leave" for instructing to add or delete a VID.

Figure 7:
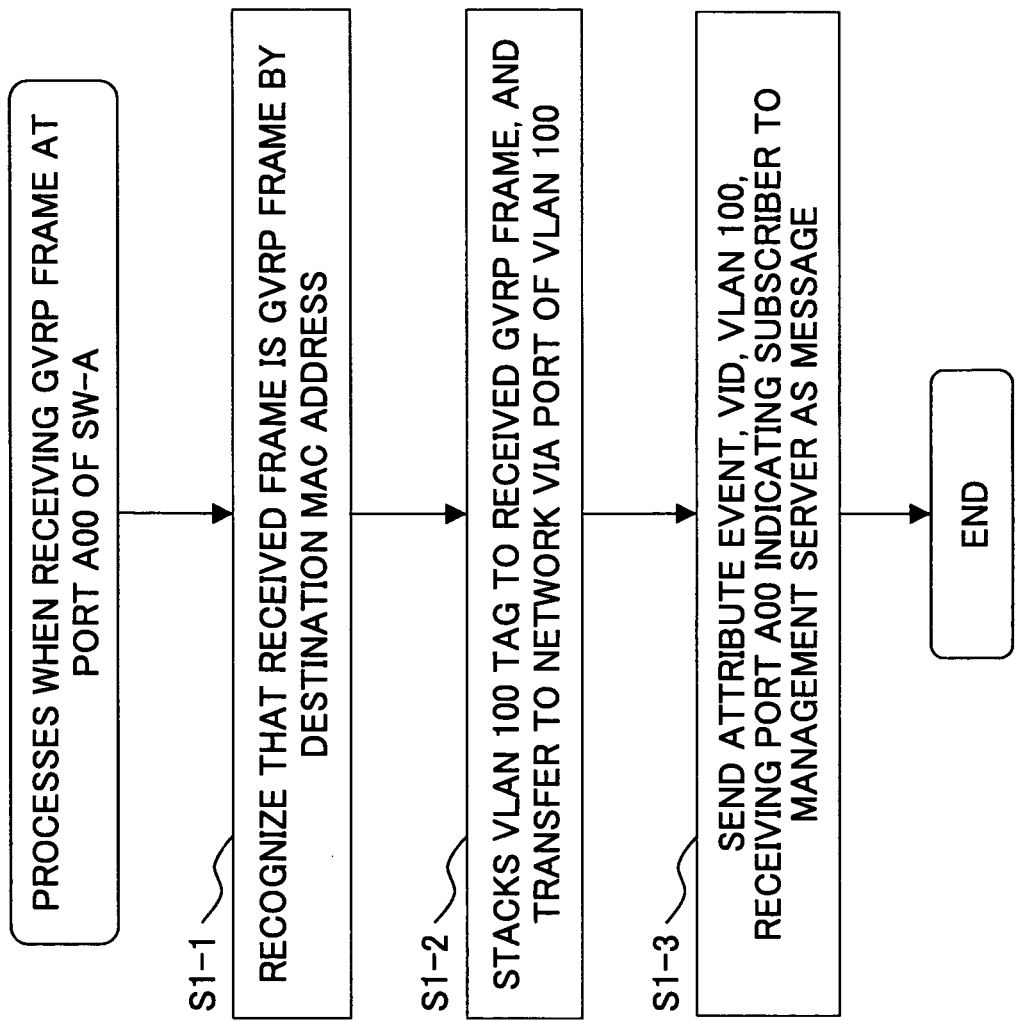
FIG. 7 is a flowchart showing processes performed in a L2 switch when the L2 switch receives the GVRP frame from a subscriber.

FIG. 7 is a flowchart showing processes performed when the L2 switch in the network receives the GVRP frame from the subscriber. In the figure, in step S1-1, the edge L2 switch 33 of the provider identifies a MAC frame as the GVRP frame by identifying whether a destination address of the MAC frame received from the subscriber A is the same as a MAC address defined for the GVRP frame.

Next, in step S1-2, the MAC frame is sent to the site 12 of the subscriber by using the VLAN 100 that is set beforehand. At this time, the edge L2 switch inserts a VLAN tag for identifying that the GVRP frame is one sent from the subscriber.

Since a GVRP frame sent for configuring a VLAN in the network 10 of the provider does not have the VLAN tag, it can be recognized whether a MAC frame is a GVRP frame (first virtual LAN configuring frame in the claims) of the subscriber or a GVRP frame (second virtual LAN configuring frame in the claims) in the network 10 of the provider.

In step S1-3, next, the edge switch extracts the attribute values in the GVRP frame and sends the information to the management server 30. At this time, in addition to the attribute information, the edge switch sends the VLAN 100 that is initially set and a receiving port a00 as information for identifying the subscriber.

Figure 8:
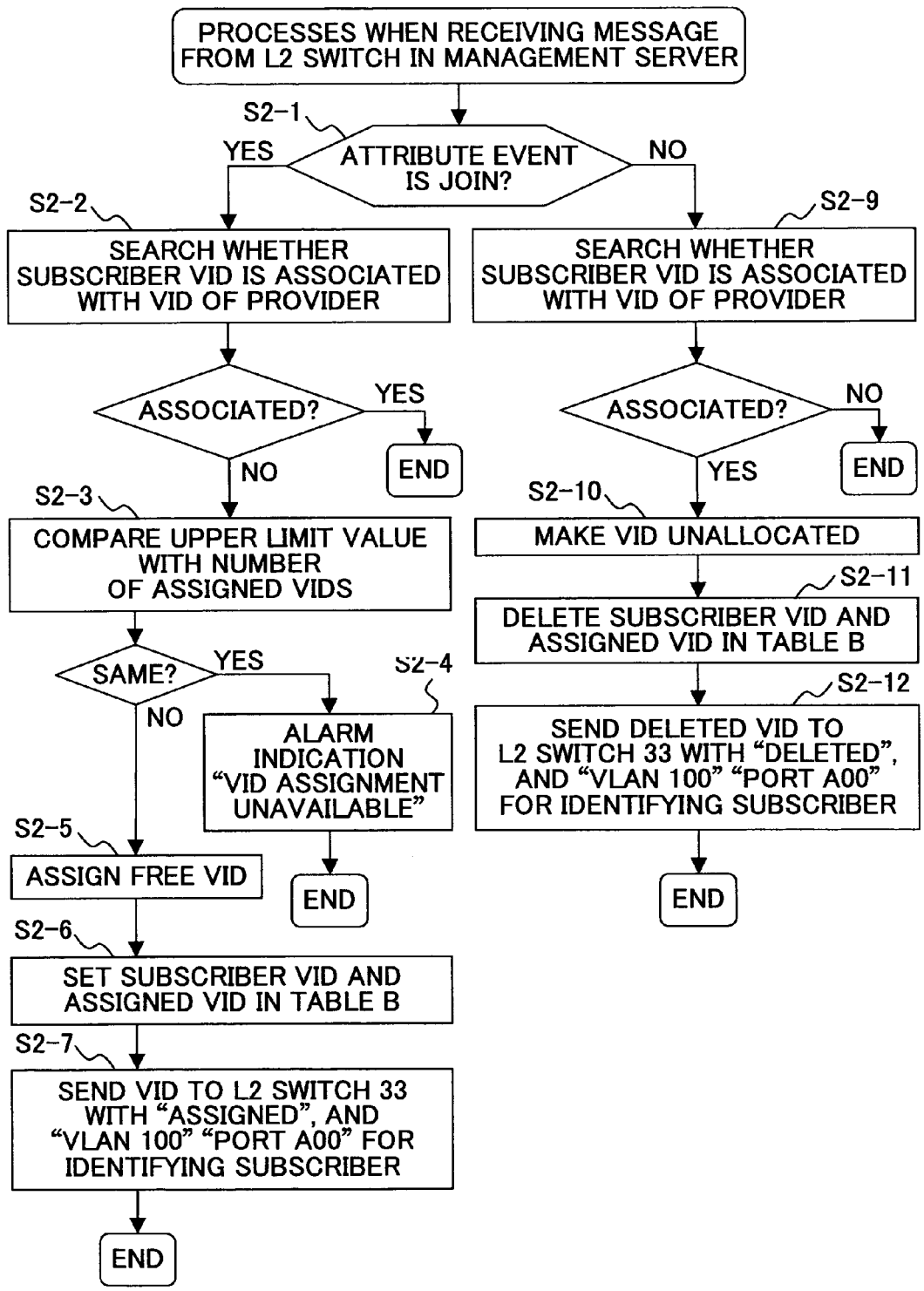
FIG. 8 is a flowchart showing processes performed in a management server when the management server receives a frame from the L2 switch.

FIG. 8 is a flowchart showing processes performed when the management server receives the frame from the L2 switch. In the figure, in step S2-1, the management server 30 checks if the GVRP frame is "Join" or "Leave" based on received information. In step S2-2, when the frame is "Join", the management server checks whether the VID of the subscriber has been associated with a VID in the network 10 of the provider based on received information.

For this purpose, for example, the management server 30 searches a table A for the subscriber and a table B for managing assigned VIDs shown in FIG. 10. The table A includes, for each initially set VLAN for subscribers, a maximum allowable number of VIDs by a contract, a number of assigned VIDs, and a pointer to the management table of assigned VIDs. The table B includes, for each subscriber VID, a VID for a provider.

That is, the management server 30 obtains a pointer of the table B from the table A so as to search the subscriber VIDs in the table B so that the management server 30 checks whether the VID of the subscriber has been registered and associated with a VID of the provider. If the result is that the VID has been assigned, since it is not necessary to newly assign a VID, the process ends.

If the VID is not associated with the VID of the provider, it is necessary to assign a new VID. In the assignment, since there is an upper limit in the number of VIDs that can be used in the network of the provider, it is not desirable to assign VIDs to one subscriber without limitation. Thus, the number of VIDs that can be used in the network of the provider is set as the maximum allowable number of VIDs in the table A based on a contract with the subscriber. In step S2-3, the management server 30 compares the maximum allowable VID number with the number of currently assigned VIDs.

If they are the same, new assignment is not performed, and the management server 30 sends an alarm to the manager of the network 10 in step S2-4. Accordingly, an operator of the network 10 can notify the subscriber that the request of adding new VID is not accepted.

Figure 11:
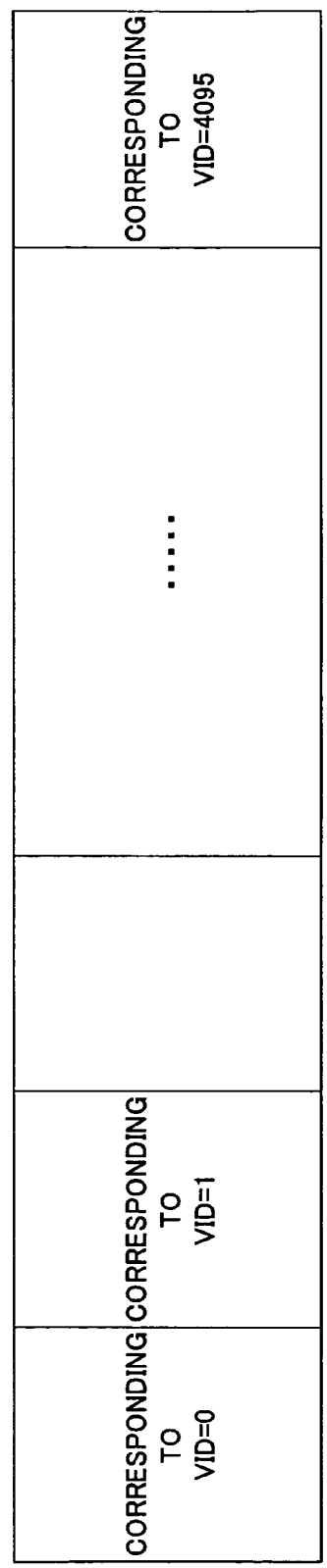
FIG. 11 shows bitmap data.

In the comparison, if they are not the same, a new VID is assigned in step S2-5. For the assignment, for example, bitmap data shown in FIG. 11 are used. In the bitmap data, each one bit corresponds to assignment state of a VID (from VID=0 to VID=4095 in the order of bits in the bitmap data). If the value of a bit is 0, it means that the corresponding VID is already assigned. Thus, by searching the bitmap data, an unused VID can be obtained.

After a VID to be assigned is determined, the management server 30 sets the VID of the subscriber and the assigned VID in the table B in step S2-6. In addition, in step S2-7, the management server 30 sends the VID to be assigned to the L2 switch 33. At this time, in addition to the VID, the management server 30 adds information "assigned" and information (VLAN 100, port a00) for identifying the subscriber.

When the GVRP frame from the subscriber is "Leave" in step S2-1, the management server 30 checks if information of the subscriber and the VID have been already associated with a VID in the network of the provider based on received information.

If the VID is associated with the VID of the network, the management server 30 makes the VID unassigned in step S2-10. This process can be performed by changing a corresponding bit in the bitmap table of FIG. 11 into 0. In addition, in step S2-11, the VID of the subscriber and the assigned VID are deleted from the table B.

Then, in step S2-12, the management server 30 notifies the L2 switch 33 of the deleted VID. At this time, information indicating "deleted" and information (VLAN 100, port a00) for identifying the subscriber are added.

Figure 9:
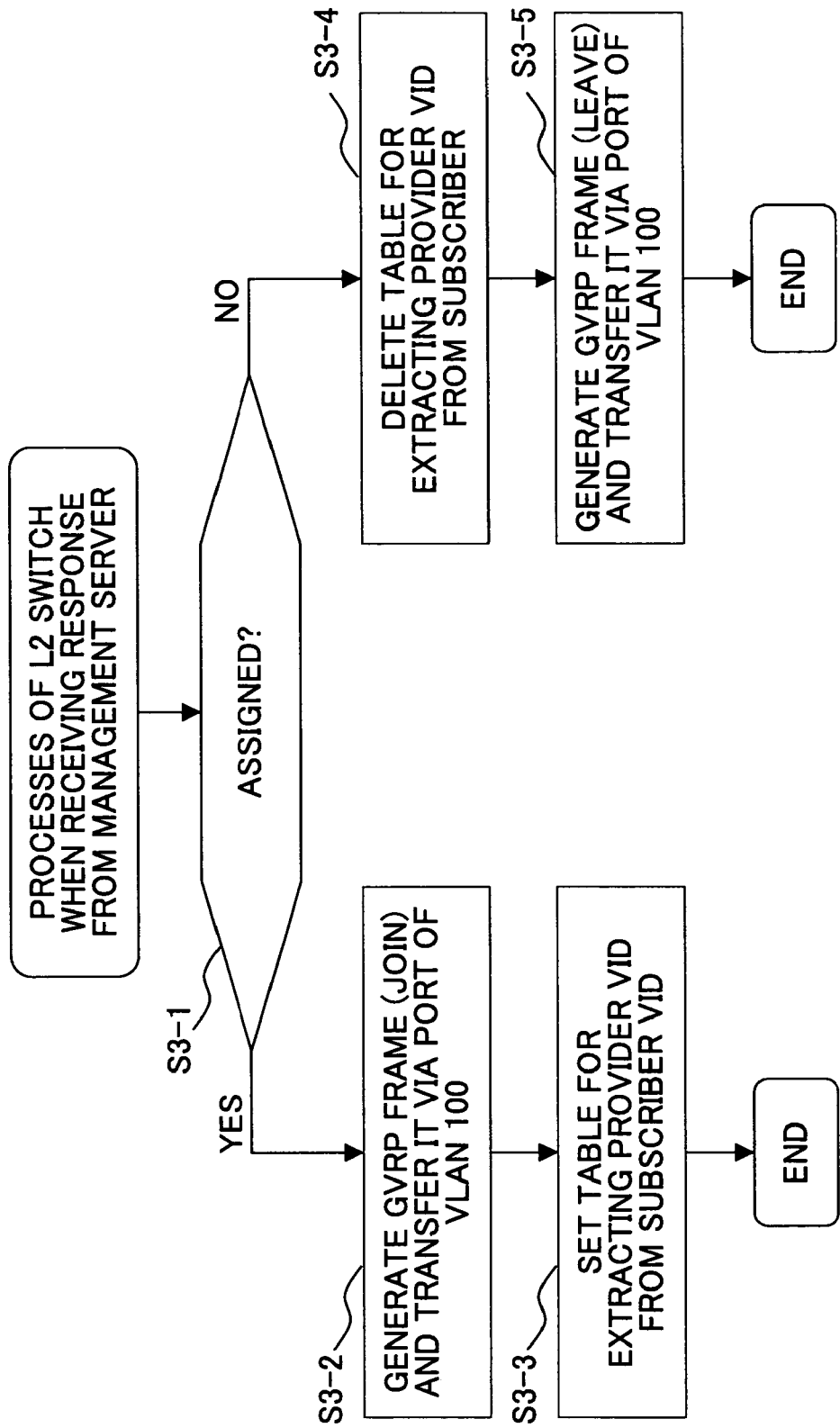
FIG. 9 shows a flowchart showing processes performed in the L2 switch when the L2 switch receives a response from the management server.

FIG. 9 shows a flowchart showing processes performed when the L2 switch receives a response from the management server. In the figure, in step S3-1, the L2 switch (L2 switch 33, for example) checks whether the VID is "assigned" or "deleted" based on information received from the management server 30.

If the VID is "assigned", the L2 switch generates a GVRP frame based on the received information and sends the GVRP frame to an adjacent L2 switch in the network 10 as an event "Join" in step S3-2. The GVRP frame is periodically sent since there is a possibility that the GVRP frame may be discarded in the network when sent only once.

The adjacent L2 switch can recognize that the frame is a GVRP frame for configuring the VLAN in the network 10 by identifying that there is no VLAN tag in the GVRP frame. Then, the adjacent L2 switch sets the L2 switch itself by using the information of the frame and transfers the GVRP frame to an adjacent L2 switch. At this time, an edge switch such as the LS switches 33 and 34 discards the GVRP frame since it is not necessary to send the GVRP frame to a subscriber. Accordingly, a VLAN can be automatically set in the network 10.

Next, the L2 switch adds the notified VID to a table C shown in FIG. 12 based on notified information from the management server 30 in step S3-3. The table C includes, for each of table relative positions 0-4095 corresponding to subscriber VIDs 0-4095, a flag (1: already set, 0: not set) indicating whether a VID of the provider has been set for the subscriber VID, and a VID value of the provider.

Figure 3:
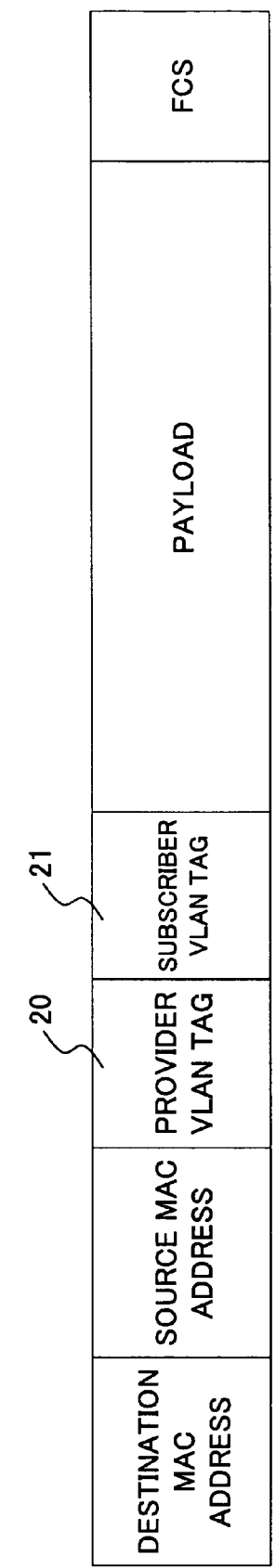
FIG. 3 shows a format of a MAC frame in which VLAN tags are stacked.

When the L2 switch receives a MAC frame to which a VLAN tag is added from a subscriber, the L2 switch refers to the table C by using the subscriber VID so as to obtain a VID to be used in the provider network 10, so that the L2 switch can add (stacks) a VLAN tag having the provider VID to the MAC frame to send the MAC frame to the network 10. The format of the MAC frame at this time is one shown in FIG. 3.

The MAC frame reaches an edge L2 switch (L2 switch 34, for example) connected to the site of the subscriber via the VLAN automatically configured by the above-mentioned GVRP frame. The edge L2 switch 34 removes the VLAN tag that was added in the L2 switch 33, and sends the MAC frame to the subscriber. Thus, the MAC frame is transferred transparently for the subscriber.

On the other hand, when "deleted" in step S3-1, the L2 switch deletes a VID at a corresponding position in the table C of FIG. 12 in step S3-4 based on received information.

Next, the L2 switch generates a GVRP frame based on the received information, and sends the GVRP frame to an adjacent L2 switch as a "Leave" message in step S3-5. The GVRP frame is periodically sent since there is a possibility that the GVRP frame may be discarded in the network when sent only once. Accordingly, the target VID can be automatically deleted from the VLAN of the network 10.

Figure 13:
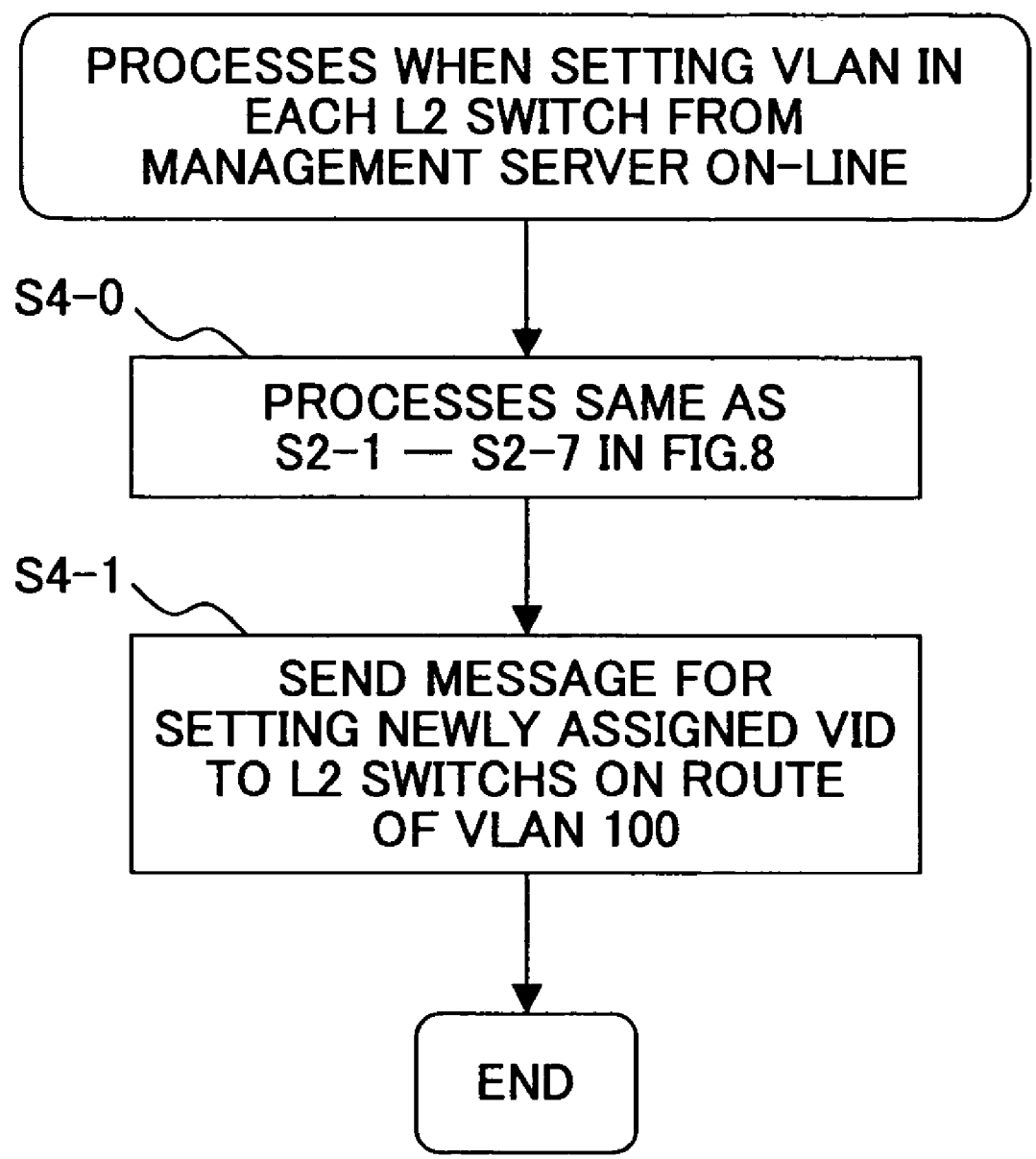
FIG. 13 shows a flowchart showing processes when the management server sets a configuration of a VLAN to each L2 switch on-line.

As another embodiment, FIG. 13 shows a flowchart showing processes when the management server on-line sets the configuration of the VLAN to each L2 switch without using GVRP for configuring a VLAN in the network 10. In this embodiment, the function for generating a GVRP frame based on the VID received from the server is not necessary in the L2 switch.

In FIG. 13, the management server 30 performs the same processes as the steps from S2-2 to 2-7 in step S4-0. After that, in step S4-1, the management server 30 sends an instruction message for configuring a VLAN to each L2 switch in the network 10. For sending this instruction, the management server 30 can know a route of the VLAN 100 initially set for the subscriber based on information of the VLAN 100, and can send the instruction message to each L2 switch via the route in the same way that GVRP is transmitted via the route.

The L2 switch that receives the instruction message adds a notified VID to the table C shown in FIG. 12.

Deleting the VID can be performed in the same way by changing information in the instruction message from the management sever. As mentioned above, also according to this embodiment, the configuration of the VLAN can be automatically set.

As mentioned above, according to the present invention, even when a plurality of VLANs are established in a network of a subscriber in which the VLANs are formed by a plurality of sites via a network of L2 switches, and the same MAC address is used for different VLANs, since VLANs can be configured such that each VLAN has a different value corresponding to a VLAN of a subscriber, it becomes possible that address learning for MAC frames of subscribers can be performed for each different VLAN in the network 10 of the provider, so that a service of relaying the MAC frame can be provided without a problem.

In addition, even when a configuration of a VLAN is arbitrarily changed in the subscriber side, a VLAN in the network 10 can be automatically configured by using the GVRP frame sent from the subscriber side. Therefor, management activities for operating the network can be decreased.

As mentioned above, according to the present invention claimed in claims 1 and 3, configuration and operation of the VLAN in the network of the layer 2 switches can be performed efficiently according to the VLAN tag of the subscriber.

In addition, according to the present invention claimed in claims 2 and 4, configuration and operation of the VLAN in the network of the layer 2 switches can be performed efficiently according to the VLAN tag of the subscriber.

Steps S1-1-S1-3 correspond to a monitoring part in the claims, steps S2-1-S2-7 corresponds to an assigning part in the claims, steps S3-1-S3-3 corresponds to a generating part, the step S4-1 corresponds to an instructing part, the tables A and B corresponds to a first table, and the table C corresponds to the second table.

What is claimed is:

1. A network connection method for configuring a virtual Local Area Network (LAN) in which plural virtual LANs distributed over plural sites are interconnected via a network formed by plural layer 2 switches, the network connection method comprising:

monitoring, by a layer 2 switch in the network, a subscriber virtual LAN identifier of a first frame for automatically configuring the virtual LAN sent from a site in the plural sites, the first frame including an attribute event, and the subscriber virtual LAN identifier being used among the plural sites;

assigning a network virtual LAN identifier based on the monitored subscriber virtual LAN identifier of the first frame if the attribute event instructs adding of the subscriber virtual LAN identifier, the subscriber virtual LAN identifier is new to the network, and a number of network virtual LAN identifiers that have already been assigned is less than an allowable maximum number, the network virtual LAN identifier being used in the network; and generating, by the layer 2 switch that has monitored the first frame, a second frame for automatically configuring a particular virtual LAN in the network based on the assigned network virtual LAN identifier, and transmitting the second frame to the other layer 2 switches in the network to interconnect the plural virtual LANs distributed over the plural sites via the particular virtual LAN.

2. The network connection method as claimed in claim 1, wherein the plural sites of an arbitrary subscriber are interconnected via a common virtual LAN that is established in advance within the network.

3. The network connection method as claimed in claim 1, wherein said assigning deletes a certain network virtual LAN identifier based on the monitored subscriber virtual LAN identifier of the first frame if the attribute event instructs deletion of the subscriber virtual LAN identifier, and the certain network virtual LAN identifier has already been assigned with respect to the monitored subscriber virtual LAN identifier.

4. The network connection method as claimed in claim 1, wherein the first frame further includes a destination Media Access Control (MAC) address and a source MAC address, and the second frame includes no subscriber virtual LAN identifier.

5. A network connection system for configuring a virtual Local Area Network (LAN) in which plural virtual LANs distributed over plural sites are interconnected via a network formed by plural layer 2 switches, the network connection system comprising:

a monitoring part in a layer 2 switch in the network configured to monitor a subscriber virtual LAN identifier of a first frame for automatically configuring the virtual LAN sent from a site in the plural sites, the first frame including an attribute event, and the subscriber virtual LAN identifier being used among the plural sites;

an assigning part configured to assign a network virtual LAN identifier based on the monitored subscriber virtual LAN identifier of the first frame if the attribute event instructs adding of the subscriber virtual LAN identifier, the subscriber virtual LAN identifier is new to the network, and a number of network virtual LAN identifiers that have already been assigned is less than an allowable maximum number, the network virtual LAN identifier being used in the network; and a generating part, in the layer 2 switch, configured to generate a second frame for automatically configuring a particular virtual LAN in the network based on the assigned network virtual LAN identifier, wherein the second frame is transmitted to the other layer 2 switches in the network to interconnect the plural virtual LANs distributed over the plural sites via the particular virtual LAN.

6. The network connection system as claimed in claim 5, wherein the assigning part includes a table associating the subscriber virtual LAN identifier that is set in the monitored first frame with the network virtual LAN identifier.

7. The network connection system as claimed in claim 5, wherein the plural sites of an arbitrary subscriber are interconnected via a common virtual LAN that is established in advance within the network.

8. The network connection system as claimed in claim 5, wherein said assigning part deletes a certain network virtual LAN identifier based on the monitored subscriber virtual LAN identifier of the first frame if the attribute event instructs deletion of the subscriber virtual LAN identifier, and the certain network virtual LAN identifier has already been assigned with respect to the monitored subscriber virtual LAN identifier.

9. The network connection system as claimed in claim 5, wherein the first frame further includes a destination Media Access Control (MAC) address and a source MAC address, and the second frame includes no subscriber virtual LAN identifier.

10. A layer 2 switch in a network connection system for configuring a virtual Local Area Network (LAN) in which plural virtual LANs distributed over plural sites are interconnected via a network, the layer 2 switch comprising:

a monitoring part configured to monitor a subscriber virtual LAN identifier of a first frame for automatically configuring the virtual LAN sent from a site in the plural sites, the first frame including an attribute event, and the subscriber virtual LAN identifier being used among the plural sites; and a generating part configured to generate a second frame for automatically configuring a particular virtual LAN in the network based on an network virtual LAN identifier that is assigned based on the monitored subscriber virtual LAN identifier of the first frame, if the attribute event instructs adding of the subscriber virtual LAN identifier, the subscriber virtual LAN identifier is new to the network, and a number of network virtual LAN identifiers that have already been assigned is less than an allowable maximum number, the network virtual LAN identifier being used in the network, wherein the layer 2 switch transmits the second frame to an adjacent layer 2 switch in the network to interconnect the plural virtual LANs distributed over the plural sites via the particular virtual LAN.

11. The layer 2 switch as claimed in claim 10, wherein the generating part includes a table that associates a subscriber virtual LAN identifier that is included in the monitored first frame with a network virtual LAN identifier notified of from a management server of the network connection system.

12. The layer 2 switch as claimed in claim 10, wherein the plural sites of an arbitrary subscriber are interconnected via a common virtual LAN that is established in advance within the network.

13. The layer 2 switch as claimed in claim 10, wherein a certain network virtual LAN identifier is deleted based on the monitored subscriber virtual LAN identifier of the first frame if the attribute event instructs deletion of the subscriber virtual LAN identifier, and the certain network virtual LAN identifier has already been assigned with respect to the monitored subscriber virtual LAN identifier.

14. The layer 2 switch as claimed in claim 10, wherein the first frame further includes a destination Media Access Control (MAC) address and a source MAC address, and the second frame includes no subscriber virtual LAN identifier.

* * * * *